United States Patent [19]
Lewis

[11] Patent Number: 5,546,239
[45] Date of Patent: Aug. 13, 1996

[54] EXTENDABLE REARVIEW MIRROR

[76] Inventor: Jimmie Lewis, 523 Indian Lake Rd., Oxford, Mich. 48371

[21] Appl. No.: 389,272

[22] Filed: Feb. 8, 1995

[51] Int. Cl.$^6$ .............................. G02B 5/08; G02B 7/00; G02B 5/10
[52] U.S. Cl. ......................... 359/855; 359/850; 359/508; 359/864; 359/865
[58] Field of Search ................................. 359/855, 850, 359/854, 872, 873, 874, 875, 876, 881, 865, 841, 866, 508, 840, 864; 248/466, 485, 479, 476

[56] References Cited

U.S. PATENT DOCUMENTS

| | | | |
|---|---|---|---|
| 2,903,210 | 9/1959 | Cousins | 248/479 |
| 3,667,718 | 6/1972 | Goslin et al. | 248/487 |
| 4,165,156 | 8/1979 | O'Connell | 350/307 |
| 4,558,930 | 12/1985 | Deedreek | 350/604 |
| 4,598,982 | 7/1986 | Levine | 359/865 |
| 4,711,538 | 12/1987 | Ohs et al. | 350/604 |
| 4,753,410 | 6/1988 | Dyer | 248/840 |
| 4,892,400 | 1/1990 | Brooks et al. | 359/865 |
| 4,892,401 | 1/1990 | Kittridge et al. | 350/626 |
| 4,921,337 | 5/1990 | Hou | 359/850 |
| 5,007,724 | 4/1991 | Hou | 359/865 |
| 5,096,283 | 3/1992 | Croteau | 248/485 |
| 5,124,847 | 7/1992 | Gong | 359/865 |
| 5,148,325 | 9/1992 | Wang | 359/841 |
| 5,210,655 | 5/1993 | Mishali | 359/850 |
| 5,225,943 | 6/1993 | Lupo | 359/841 |
| 5,337,190 | 8/1994 | Kogita et al. | 359/877 |
| 5,375,014 | 12/1994 | Fujie et al. | 359/841 |

FOREIGN PATENT DOCUMENTS 658679  10/1951  United Kingdom .

*Primary Examiner*—Paul M. Dzierzynski
*Assistant Examiner*—Mohammad Y. Sikder
*Attorney, Agent, or Firm*—Howard & Howard

[57] ABSTRACT

An exterior rearview mirror assembly for a vehicle including an extendable mirror for improved rearward viewing is disclosed. Several embodiments of the rearview mirror assembly each comprise a mirror housing, a mirror disposed in the mirror housing, and some structure to allow extension of the mirror between an inboard position and an outboard position. In one embodiment, the mirror assembly includes structure to allow rotation of the mirror between inboard and outboard positions. The mirror may comprise a post disposed in a mirror shell and extending along a longitudinal horizontal axis which extends through a plane defined by the mirror, offset from a central vertical axis of the mirror. In another embodiment, the means for rotating the mirror comprises a pivot part having a shaft disposed in an aperture in the mirror shell, which is disposed along the longitudinal horizontal axis. In yet another embodiment, the means for extending the mirror from an inboard position to an outboard position comprises a groove in the mirror housing, in which a mirror frame is slidably disposed. The frame may be slid, relative to the mirror housing, from an inboard position to an outboard position.

14 Claims, 5 Drawing Sheets

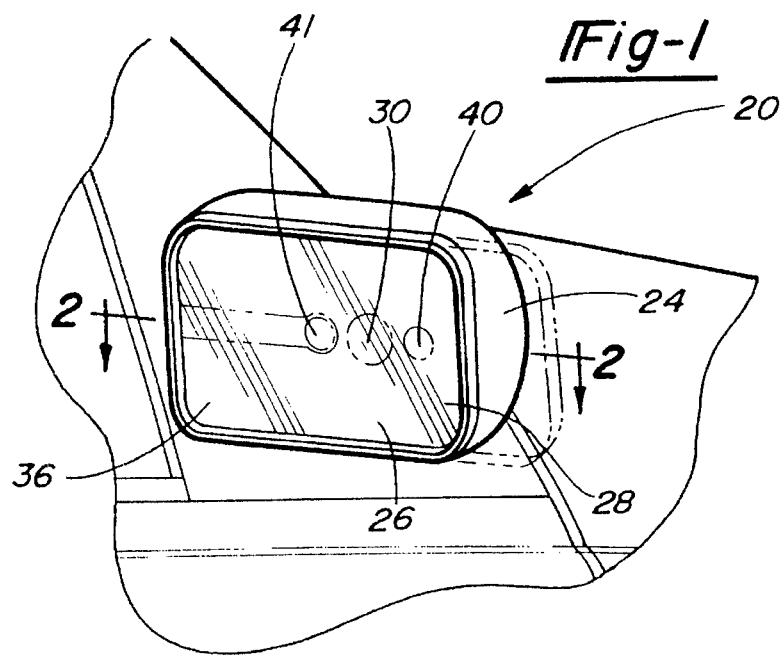
Fig-1
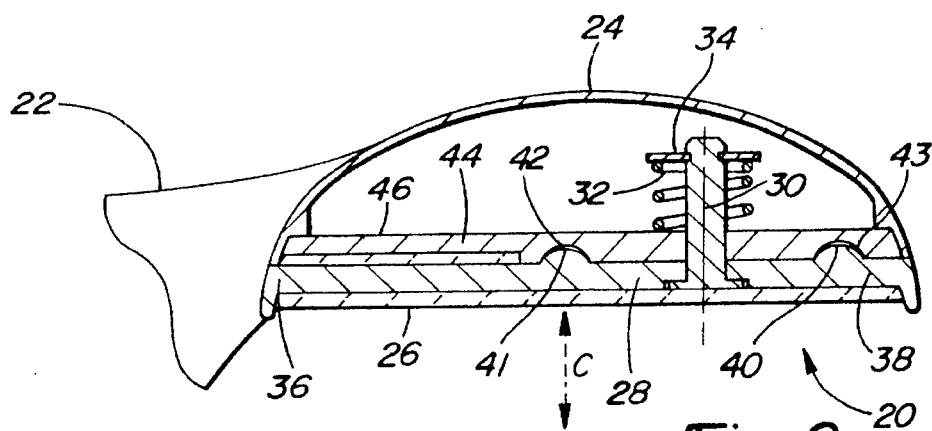
Fig-2
Fig-3

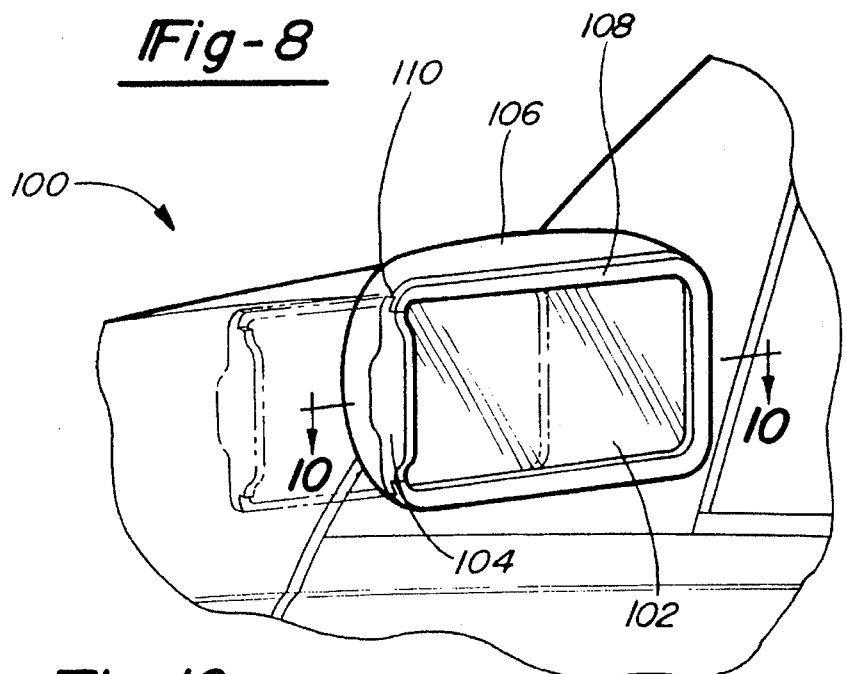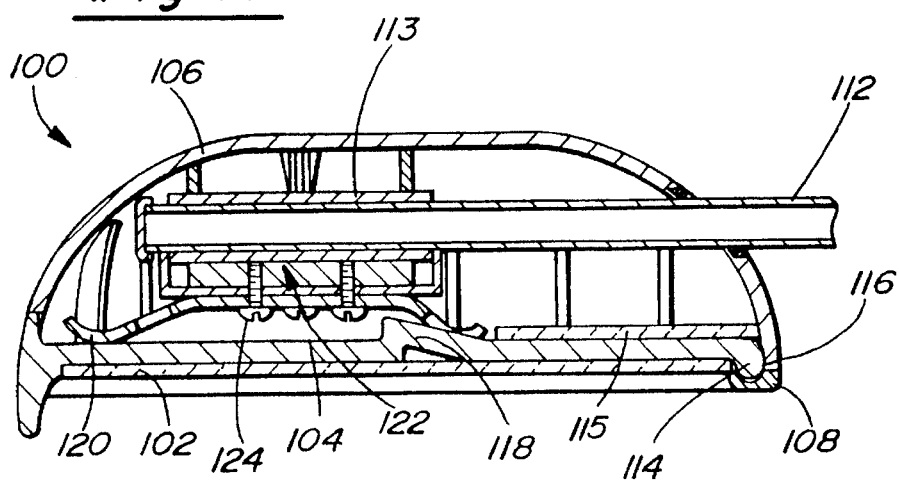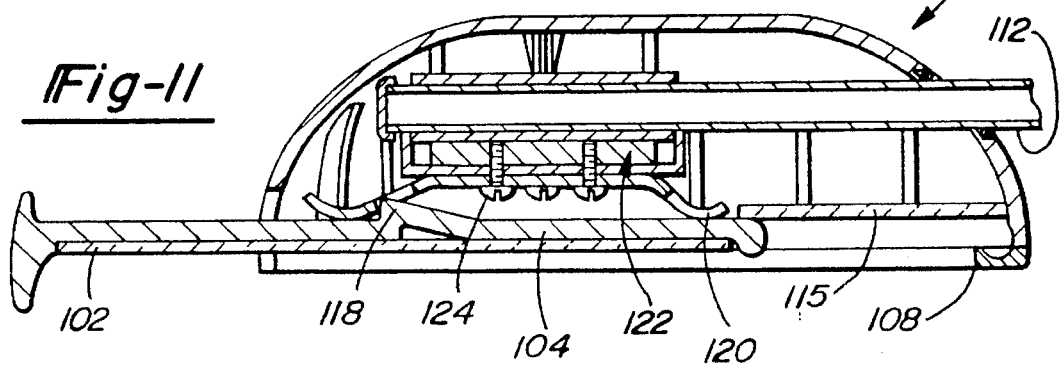

5,546,239

EXTENDABLE REARVIEW MIRROR

BACKGROUND OF THE INVENTION

The present invention relates to an exterior rearview mirror assembly for a vehicle including a mirror which can be extended from a normal viewing position adjacent the vehicle to an outboard position for improved rearward viewing.

Exterior rearview mirror assemblies are typically used on all motor vehicles. Adjustable or extendable exterior, side-mounted rearview mirrors are also known in the art. Extendable mirrors provide improved rearward viewing, for example, when the vehicle is towing a trailer, camper or other towed item. These mirror assemblies typically incorporate a mounting bracket which extends from an exterior panel of a vehicle. In one prior art example, a rearview mirror is positioned on the mounting bracket and can be extended to an outboard location by loosening a fastener and sliding the mirror outwardly for improved viewing. In another prior art example, a rearview mirror is positioned on an extension bracket located on a mounting bracket which can be rotated about a vertical axis to an outboard location for improved viewing.

However, such rearview mirror assemblies have certain problems, particularly with respect to the mounting brackets. These rearview mirror assemblies, especially those incorporating an extended mounting bracket, experience a great deal of vibration during operation of the vehicle. The mount structure used in the prior art mirrors are not able to withstand this vibration and, therefore, display a great deal of shaking in the mirror image during the operation of the vehicle.

Another problem in the prior art is the difficulty an operator experiences is adjusting the rearview mirror between an inboard and outboard position. An operator may only wish to use the outboard position temporarily, and it is important to allow easy and quick movement between the two positions. The prior art has not be able to successfully provide a extendable rearview mirror assembly that is easily moved between inboard and outboard positions and still able to withstand the vibration experienced by such assemblies during operation of the vehicle.

SUMMARY OF THE INVENTION

In one feature of this invention, a mirror is extended laterally outward from an inboard position to an outboard position where a secondary mirror surface is exposed, thereby providing improved lateral rearward viewing. In the inboard position, the secondary mirror surface is concealed behind the mirror and mirror frame in a mirror housing. The mirror assembly comprises structure to allow easy movement of the mirror and mirror frame laterally outward relative to a mirror housing from the inboard to the outboard position. The structure provides a secure mount at either position.

In other features of this invention, a mirror and at least a portion of a mirror housing are rotatable about a longitudinal horizontal axis which runs through the plane of the mirror and non-parallel to the plane of the mirror. The longitudinal horizontal axis is offset from a central vertical axis of the mirror. Rotation of the mirror about the horizontal axis moves the mirror relative to the vehicle between inboard and outboard positions i.e., thereby providing improved lateral rearward vision to the operator of the vehicle. Again, the mount structure allows easy movement and provides a secure mount.

In one preferred embodiment of this invention, the extendable rearview mirror assembly includes a mirror shell having a post aligned with a longitudinal horizontal pivot axis offset from a central vertical axis of a mirror. The mirror is rotatably mounted in a mirror frame which is rotatably spring-loaded onto the post. The mirror frame is thus biased against the mirror shell for improved stability. The mirror frame has detents defining inboard and outboard positions, which are selectively received in a notch disposed in the mirror shell. In a most preferred embodiment, the mirror shell also has a reflective surface located behind the mirror and mirror frame in the inboard position, which is exposed when the mirror and mirror frame are rotated to an outboard position.

In another preferred embodiment of this invention, the mirror assembly includes a mirror shell which has a slot or groove running the horizontal length of the mirror shell. A pivot cap and pivot member are securely mounted onto a post which is attached to an exterior panel of a vehicle. The groove of the mirror shell is received on the post. The pivot member is rotatably spring-loaded into the mirror shell. The spring loading of the pivot member in the mirror shell biases the mirror shell against the post for improved vibrational stability. An operator of the vehicle is able to quickly and easily rotate the mirror and mirror shell about a longitudinal horizontal axis defined by the central axis of the pivot member. The mirror and mirror shell are rotated about the horizontal axis by pulling the mirror shell away from the post, thereby removing the post from the groove or slot, and rotating the mirror shell 180° to an outboard position. The groove is received on the post at this location and the spring loading biases the mirror shell against the post to provide stability.

In another preferred embodiment of this invention, the mirror assembly includes a mirror disposed in a mirror frame, which is slidable between inboard and outboard positions. The mirror frame is disposed in a mirror housing having a secondary mirror surface, which is concealed behind the mirror and mirror frame in the inboard position, but exposed in the outboard position, thereby providing improved rearward viewing. The mirror frame is disposed in a groove in the mirror housing with a plate biasing the mirror frame in the groove to provide a secure mount for the mirror and mirror frame during operation of the vehicle.

These and other features of the present invention will be best understood from the following specification and drawings, of which the following is a brief description.

BRIEF DESCRIPTION OF THE DRAWINGS

FIG. 1 is a perspective view of a rearview mirror assembly in accordance with the invention herein;

FIG. 2 is a cross-sectional view of the mirror assembly of FIG. 1 along line 2—2;

FIG. 3 is a cross-sectional view of the mirror assembly of FIG. 1 with the mirror in an extended position;

FIG. 8 is a perspective view of another alternative rearview mirror assembly in accordance with the invention herein;

FIG. 10 is a cross-sectional view of the mirror assembly of FIG. 8 along line 10—10; and FIG. 11 is a cross-sectional view of the mirror assembly of FIG. 8 with the mirror in an extended position.

DETAILED DESCRIPTION OF A PREFERRED EMBODIMENT OF THE INVENTION

Figure 4:
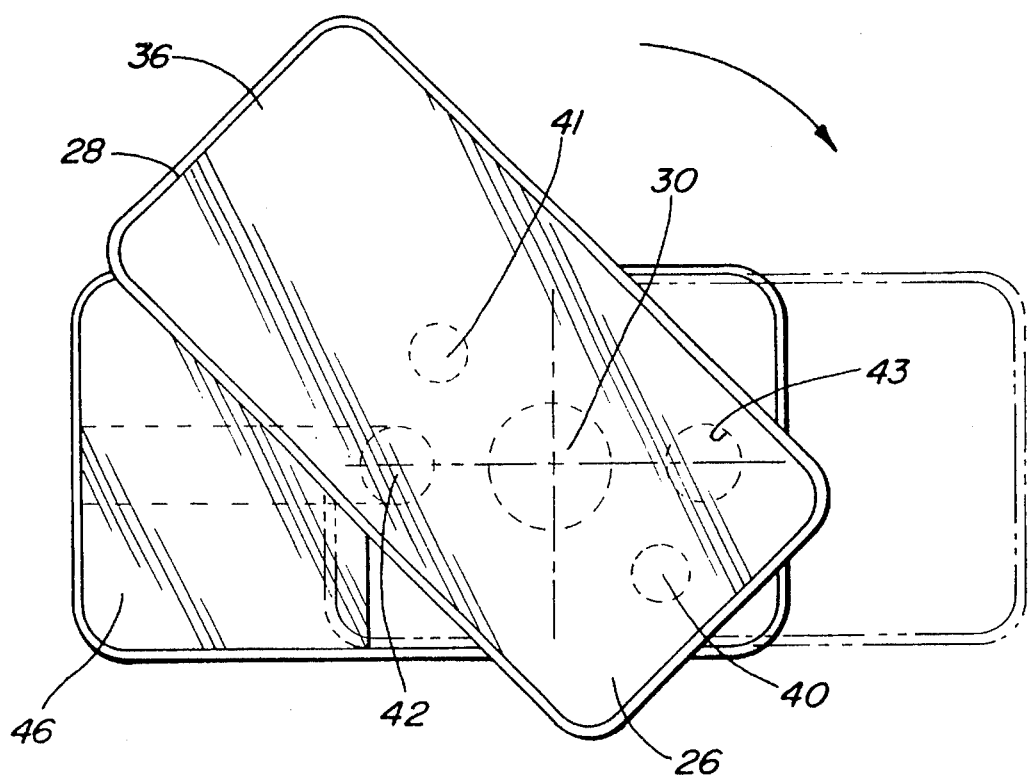
FIG. 4 is a front elevation view of the mirror assembly of FIG. 1.

FIG. 1 illustrates a novel rearview mirror assembly 20 which can be rotated between an inboard position and an extended, outboard position. The outboard position provides better viewing when the vehicle is pulling a trailer, camper or other towed item. The construction of the mirror assembly, particularly the mounting of the mirror and mirror frame in the mirror housing of the mirror assembly, is secure and resists typical vibrational forces exerted on rearview mirror assemblies during operation of the vehicle. Therefore, the rearview mirror assembly 20 provides improved rearward viewing without distortion in the mirror image.

As shown in FIG. 2, the rearview mirror assembly 20 includes an attachment member 22 for mounting a mirror shell 24 to an exterior panel of a vehicle. A mirror 26 is centrally mounted on a mirror frame 28 which is received in mirror shell 24. A mounting post 30 extends along a longitudinal horizontal axis of the mirror shell 24 which is laterally offset from the central vertical axis C of the mirror shell 24. The mirror frame 28 is mounted on post 30 and held in place by nut 34, which is received over and fixed to post 30. As shown, there is slight clearance between post 30 and frame 28 such that frame 28 may rotate relative to post 30. Alternatively, the two may be fixed for common rotation. Spring 32, with nut or retainer ring 34, biases mirror frame 28 rearwardly against a plate or backing 44, which is fixed to mirror shell 24. Mirror frame 28 includes detents 40 and 41, one of which is selectively received in a notch 42 disposed in backing 44 and the other of which is received in notch 43. Backing 44 may preferably contain a reflective mirror surface 46, which provides additional rearward viewing for an operator of the vehicle when the mirror 26 is in the-outboard position.

In an inboard position, a lateral edge 36 of mirror 26 is disposed adjacent the vehicle, detent 41 is received in notch 42, detent 40 is received in notch 43, and mirror surface 46 remains unexposed behind the lateral edge 36 of mirror 26 and mirror frame 24. The mirror frame 28 and mirror 26 are disposed in the mirror shell 24 such that the circumference of the mirror frame 28 is aligned with the circumference of the mirror shell 24. The spring 32 biases mirror frame 28 rearwardly against backing 44, thereby maintaining the mirror frame 28 and mirror 26 in its inboard position and resisting vibrational forces on the mirror. The mirror frame 24, and hence mirror 26, can be rotated about the central axis of the post 30 to an outboard position, which is shown in phantom lines in FIG. 1, as described below.

As shown in FIG. 3, in an outboard position, the lateral edge 36 of mirror 26 is disposed remote from the vehicle, detent 40 is received in notch 42, detent 41 is received in notch 43, and mirror surface 46 is exposed for additional rearward viewing. The mirror 26 defines a plane. The mirror 26 and mirror frame 28 rotate about a longitudinal horizontal axis which extends through the mirror plane. In this embodiment, the central axis of the post 30 defines the longitudinal horizontal axis which travels through the plane of the mirror about which the mirror 26 rotates. Preferably, the longitudinal horizontal axis is disposed midway between the central vertical axis and the outer lateral edge 38 of the mirror frame.

As shown in FIG. 4, the operator of the vehicle can easily and quickly rotate the mirror from an inboard to an outboard position for improved rearward viewing. First, the operator of the vehicle pulls the mirror frame 28 and mirror 26 outwardly along the longitudinal horizontal axis to move detent 41 outwardly from notch 42 and detent 40 out of notch 43. This is shown in phantom line in FIG. 2. Mirror frame 28 and mirror 26 are then rotated 180° about the central axis of the post 30. The spring 32 biases mirror frame 28 back rearwardly against mirror shell 24. In an outboard position, a lateral edge 36 of the mirror 26 and mirror frame 28, previously adjacent the vehicle, is disposed in a position remote from the vehicle. The distal or outer (in the inboard position) lateral edge of the mirror 38 is rotated 180° to a position adjacent the vehicle. Detent 40 is now disposed in notch 42, and detent 41 is now disposed in notch 43. At the outboard position, the mirror assembly 20 provides additional rearward viewing to an operator of a vehicle by positioning the mirror farther laterally outwardly than it was in the inboard position. This outboard position is particularly helpful when the operator of a vehicle is pulling a trailer, camper or other towed item. Because of the mounting design, mirror 26 and mirror frame 28 are securely biased against the mirror shell 24. The mirror assembly 20 is thus able to resist the vibrational forces typically experienced by a rearview mirror assembly during operation of the vehicle.

Figure 5:
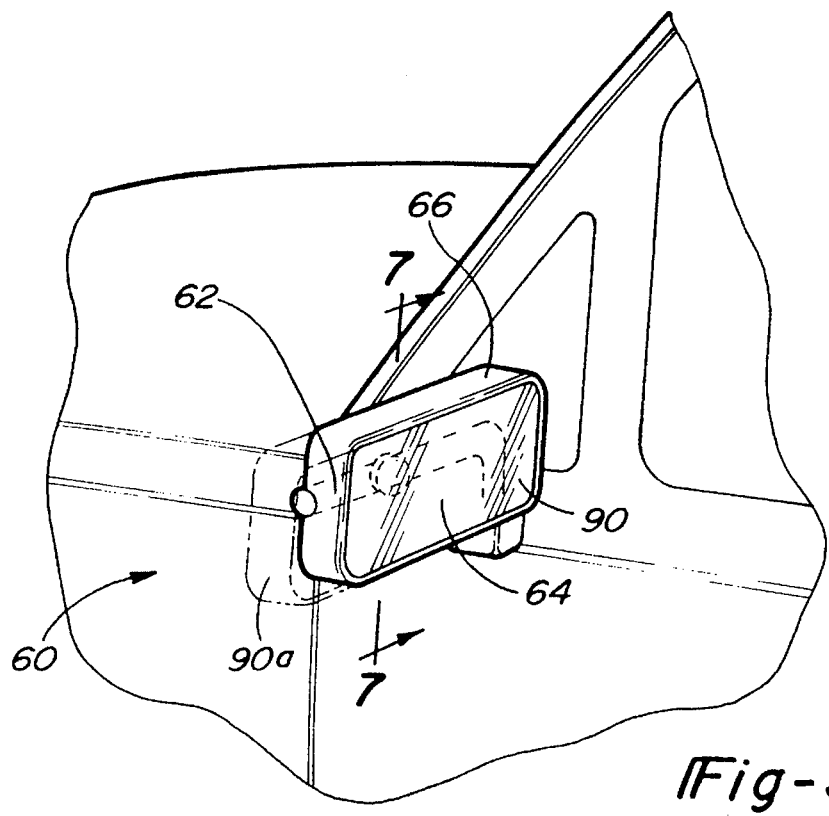
FIG. 5 is a perspective view of an alternative rearview mirror assembly in accordance with the invention herein.

As shown in FIG. 5, an alternative rearview mirror assembly 60, which may be particularly useful in a heavy truck or camper-type vehicle, includes an L-shaped post 62 which has a lateral portion that attaches to the side of a vehicle 50 and a horizontal portion that attaches to mirror shell 66. A mirror 64 is centrally mounted on mirror shell 66 in any known manner. In this alternative embodiment, the operator of vehicle 50 is able to easily and quickly rotate the entire mirror 64 and mirror shell 66 from an inboard position to an outboard position (shown in phantom lines) to provide improved rearward viewing.

Figure 6:
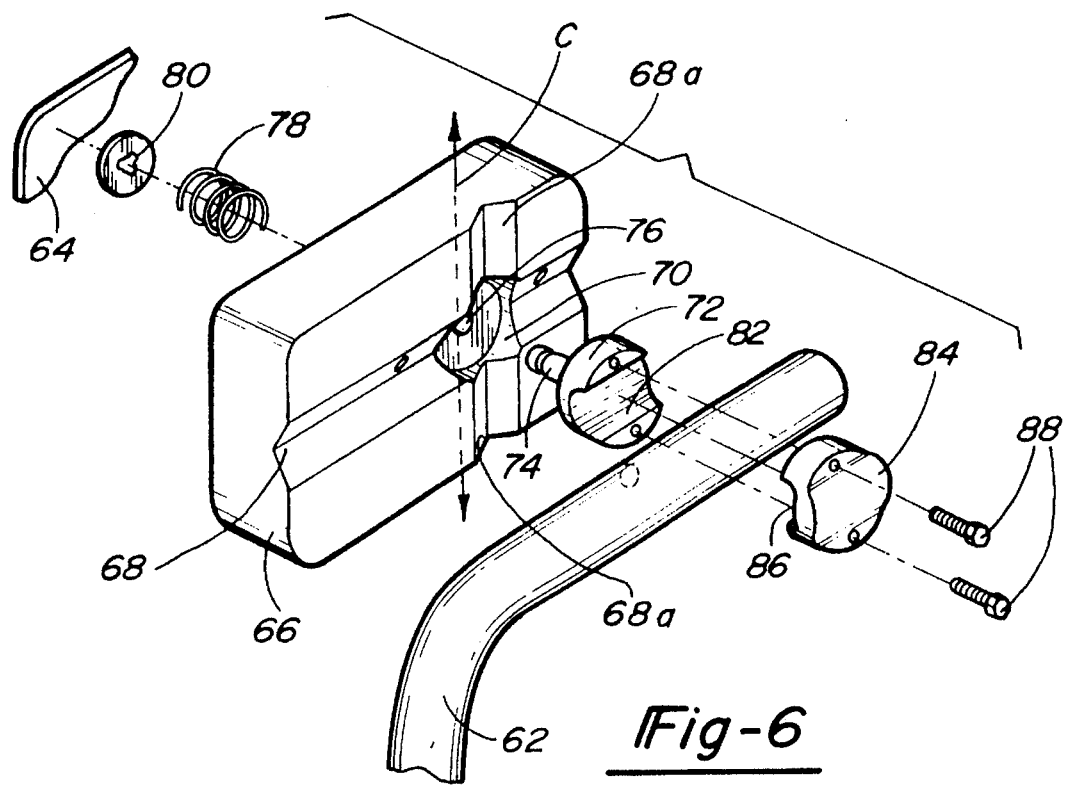
FIG. 6 is an exploded perspective view of the alternative mirror assembly of FIG. 5.

As shown in FIG. 6, mirror shell 66 contains a slot or groove 68 which runs the length of the mirror shell 66, and includes a pivot slot 70. Preferably, groove 68 is triangular in cross-section, thus providing two contact lines, even if there is dirt on post 62 or in groove 68. Slot 70 receives pivot member 72. Pivot member 72 has a shaft 74 which is axially received in bore 76 of pivot slot 70. Pivot member 72 is rotatably mounted in pivot slot 70 by sliding shaft 74 through aperture 76. Coil spring 78 and retainer ring 80 are axially received from the mirror side of mirror shell 66 onto shaft 74 of pivot member 72. Pivot member 72 also includes a channel 82 on the opposed end to shaft 74 which is received on a portion of post 62. Channel 82 is aligned with groove 68 such that post 62 is received in both. Pivot cap 84 also has a channel 86, which, together with channel 82, secures the pivot assembly on post 62. Pivot cap 84 and pivot member 72 are securely mounted onto post 62 with screws 88.

A pair of alternative grooves 68a allow further rotation positions for the mirror. When post 62 is received in grooves 68a, the mirror will extend generally vertically, thus protecting the mirror.

Figure 7:
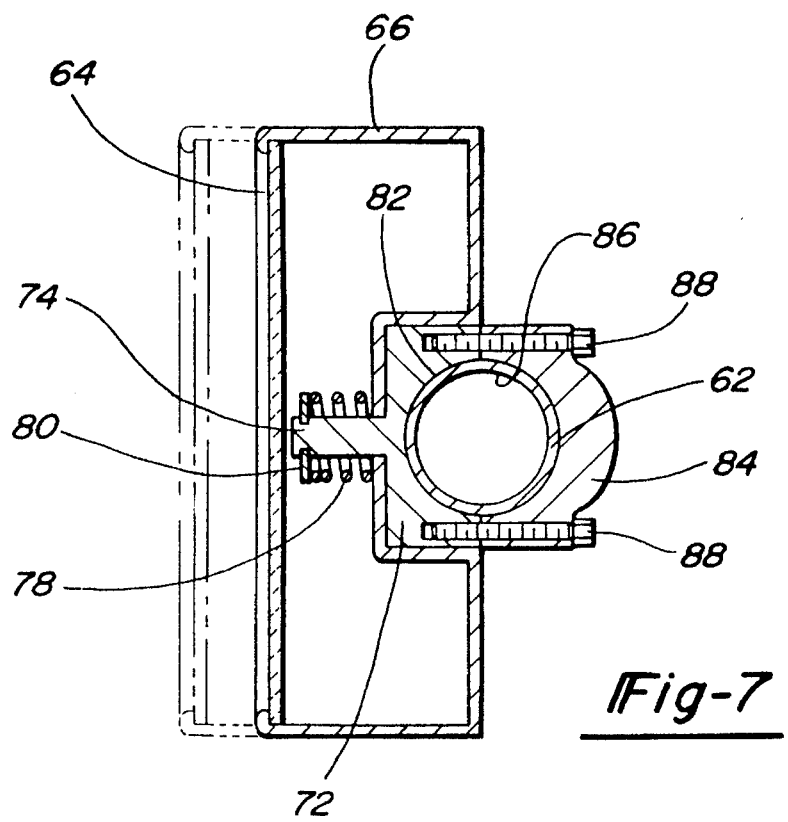
FIG. 7 is a cross-sectional view of the mirror assembly of FIG. 5 along line 7—7.

As shown in FIG. 7, post 62 is disposed between pivot member 72 and pivot cap 84 in channels 82 and 86. Post 62 is also disposed in slot or groove 68 for a substantial length of the horizontal portion of post 62. Because pivot member 72 is spring loaded onto mirror shell 66 by spring washer 78 and retainer ring 80, and pivot member 72 is securely mounted onto post 62, the mirror shell 66 is biased against post 62 with groove 68 received on post 62, along the horizontal length of mirror shell 66. The biasing of mirror assembly 60 against post 62, allows the mirror assembly to resist the vibrational forces typically experienced by mirror assemblies during operation of the vehicle.

The pivot axis of the mirror assembly 60 is aligned with the central axis of the pivot cap 84, pivot member 72 and pivot slot 70, which travels through the plane defined by mirror 64. This axis defines a longitudinal horizontal axis about which the mirror rotates and is laterally off-set from the central vertical axis C (see FIG. 6) of the mirror shell 66 and mirror 64. The mirror 64 and mirror shell 66 can be selectively rotated between inboard and outboard positions about the longitudinal horizontal axis. In the inboard position of the mirror assembly 60, a lateral edge 90 (see FIG. 5) of the mirror shell 66 is disposed adjacent the vehicle and the post 62 is disposed in groove or slot 68. When, for example, an operator is pulling a trailer, the operator may rotate the mirror shell 66 and mirror 64 to an outboard position by, first, pulling the mirror shell 66 and mirror 64 along the longitudinal horizontal axis defining the pivot axis away from post 62, thereby displacing post 62 from groove 68. Then, the mirror shell 66 and mirror 64 are rotated 180°, until post 62 is again aligned with groove 68. Mirror shell 66 is then released and biased back to position the mirror shell 66 against the post 62 in an outboard position.

Because the pivot axis is offset from the central vertical axis of the mirror shell 66 and mirror 64, the outer edge (90a in FIG. 5) of the mirror shell 66 and mirror 64 is now disposed farther outwardly than the lateral remote edge 92 of the mirror 64 and mirror shell 66 in the inboard position. Preferably, the longitudinal horizontal axis is disposed midway between the central vertical axis and the outer lateral edge 92 of the mirror shell 66.

In the mirrors shown in FIGS. 1–7, the pivot axis for the mirror is one which extends through the plane of the mirror. That is, it is non-parallel to the plane of the mirror, and passes through that plane. In fact, as is clear from the figures, the axes are generally perpendicular to the plane of the mirror.

As shown in FIG. 8, another alternative rearview mirror assembly 100 comprises a mirror 102 disposed in a mirror frame 104 which can be extended from an inboard position to an outboard position to provide improved lateral rearward viewing to the operator of a vehicle. The mirror assembly 100 includes a mirror housing comprising a shell 106 and a rim 108 which form a groove 110. The mirror frame 104 is disposed in groove 110 and is slidable between an inboard position and an outboard position (shown in phantom lines).

Figure 9:
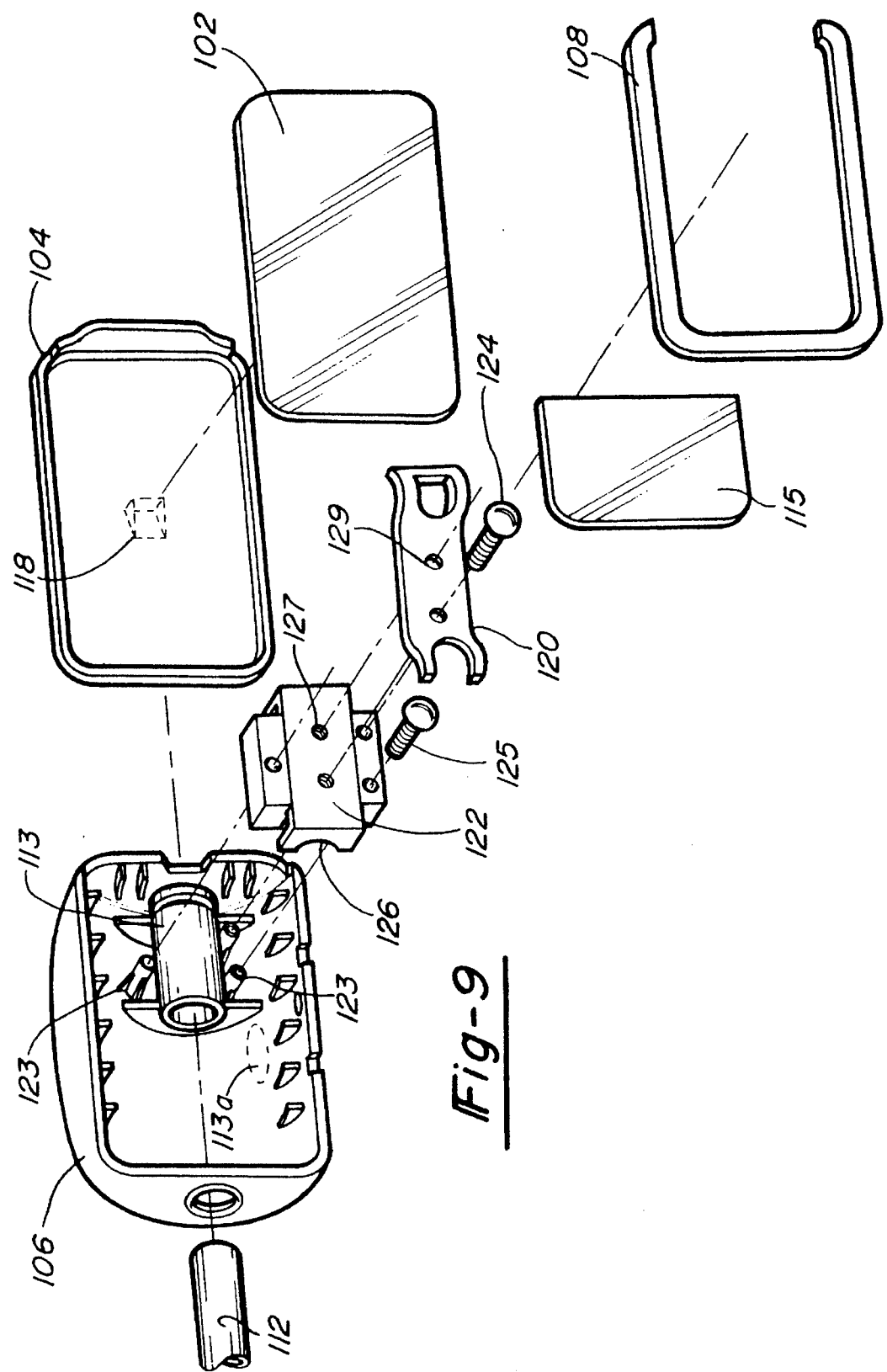
FIG. 9 is an exploded perspective view of the alternative mirror assembly of FIG. 8.

As shown in FIG. 9, the mirror assembly 100 also includes an attachment member 112 (e.g., a post) which attaches the mirror housing to an exterior panel of a vehicle. At the other end, post 112 slides into sleeve 113 disposed in mirror shell 106 and is securely attached thereto to resist the vibrational forces experienced by the mirror assembly 100 during operation of the vehicle. Alternatively, the mount might extend through a bottom opening 113a, depending on the vehicle. Mirror assembly 100 also includes spring plate 120 and bracket 122 which are disposed in mirror shell 106. Bracket 122 is received on bosses 123 disposed in mirror shell 106 and over sleeve 113. Bracket 122 is securely fixed in mirror shell 106 by tightening self-tapping screws 125 into bosses 123 in mirror shell 106. Bracket 122 contains a channel 126 which receives sleeve 113 and also contains posts 127, which receive and support spring plate 120. Plate 120 is securely attached to bracket 122 by heat staking the end posts 127 in openings 129 in plate 120.

As shown in FIG. 10, mirror frame 104 contains a detent 114 disposed in a lateral edge adjacent the vehicle which is received in notch 116 of rim 108 when the rearview mirror assembly 100 is in the inboard position. The detent 114 and notch 116 are biased into the mirror frame 104 at the inboard position and prevent the mirror frame 104 from sliding out of the inboard position without a predetermined pulling force being applied to the mirror frame 104. A reflective mirror surface 115 is disposed in mirror shell 106 adjacent the vehicle and concealed behind mirror frame 104 in an inboard position.

As shown in FIG. 11, mirror frame 104 also contains a stop 118 which prevents the mirror frame from completely sliding out of groove 110 and housing 106 when a pulling force is applied to the mirror frame 104. When a pulling force is applied to mirror frame 104 detent 114 rides out of notch 116 from an inboard position toward an outboard position, until stop 118 prevents further movement of mirror frame 104. Spring plate 120, which is attached to bracket 122, provides a bias force against mirror frame 104 to provide a secure mount at either position.

It is envisioned that the inventive mirrors could be provided with an adjustment motor by having the motor push against the mirror shell, rather than the mirror plate. In such an embodiment, the mirror would be mounted to the vehicle such that movement of the entire mirror shell relative to its mounting bracket would be affected to adjust mirror positioning.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. An extendable rearview mirror assembly for a vehicle comprising:

a mirror housing;

a mirror disposed in said mirror housing, said mirror defining a plane; and structure for allowing rotation of said mirror about a longitudinal pivot axis which extends through the plane of said mirror and non-parallel to the plane of the mirror, said axis being offset from a central axis of said mirror such that rotation of said mirror about said pivot axis moves said mirror between inboard and outboard positions, said inboard and outboard positions are disposed 180° apart from each other around said pivot axis.

2. The rearview mirror assembly as recited in claim 1, further comprising a means for biasing said mirror against said mirror housing to lock said mirror at said inboard and outboard positions.

3. The rearview mirror assembly as recited in claim 1, wherein said pivot axis extends through said mirror between a central axis and a lateral outer edge of said mirror housing.

4. An extendable rearview mirror assembly as recited in claim 1, wherein said axis is generally perpendicular to said plane of said mirror.

5. An extendable rearview mirror assembly for a vehicle comprising:

a mirror shell;

a post disposed along a longitudinal pivot axis;

a mirror frame disposed on said post and said mirror frame being rotatable relative to said shell on said pivot axis of said post; and a mirror disposed in said minor frame, said mirror defining a plane; wherein said longitudinal pivot axis travels through the plane of said mirror non-parallel to the plane of the mirror and is offset from a central axis of said mirror such that rotating of said mirror about said axis moves said mirror between inboard and outboard positions, further comprising a spring and retainer ring axially received on said post, said spring biasing said mirror frame against said mirror shell.

6. The rearview mirror assembly as recited in claim 5, wherein said mirror frame further comprises a plurality of detents disposed remote from said mirror and said mirror shell further comprises at least one notch for selectively receiving said detents.

7. The rearview mirror assembly as recited in claim 6, wherein said mirror frame comprises two detents, one defining an inboard position and the other defining an outboard position of the mirror.

8. The rearview mirror assembly as recited in claim 7, wherein said two detents are disposed 180° from each other around said post, thereby allowing an operator of said vehicle to rotate said mirror 180° about said horizontal axis between said inboard and outboard positions.

9. The rearview mirror assembly as recited in claim 5, wherein said post is disposed between the central axis of said mirror shell and a lateral outer edge of said mirror shell.

10. An extendable rearview mirror assembly as recited in claim 5, wherein said axis is generally perpendicular to said plane of said mirror.

11. An extendable rearview mirror assembly for a vehicle comprising:

a mirror shell having opposed lateral edges and a horizontal groove running between said edges;

a post for attaching said mirror shell to an exterior panel of a vehicle said groove being received on said port;

a mirror disposed in said mirror shell, said mirror defining a plane; and a pivot part securely attached to said post and having a shaft remote from said post which is received in an aperture extending through said groove, and disposed along a longitudinal pivot axis which extends non-parallel to, and through, the plane of said mirror further comprising a spring on said shaft, said spring biasing said mirror shell against said post, said pivot axis being offset from a central axis of said minor, and said mirror being rotatable on said pivot axis between inboard and outboard positions.

12. The rearview mirror assembly as recited in claim 11, wherein said pivot part comprises a pivot member and a pivot cap securely attached to said pivot member thereby forming a channel which receives said post, said shaft disposed on said pivot member, extending away from said channel.

13. The rearview mirror assembly as recited in claim, 11, wherein said aperture is disposed midway said central axis and a lateral outer edge of said mirror shell.

14. An extendable rearview mirror assembly as recited in claim 11, wherein said axis is generally perpendicular to said plane of said mirror.

* * * * *